United States Patent [19]

Jechart

[11] 3,903,481

[45] Sept. 2, 1975

[54] GAS CELL ATOMIC FREQUENCY STANDARD HAVING SELECTED ALKALI VAPOR ISOTOPE RATIOS

[76] Inventor: Ernst Jechart, Isabertstrasse 2, 8 Munich 21, Germany

[22] Filed: Mar. 27, 1974

[21] Appl. No.: 455,269

[30] Foreign Application Priority Data

Apr. 5, 1973 Germany.............................. 2317098

[52] U.S. Cl........................................ 331/3; 331/94
[51] Int. Cl. ............................................. H03b 3/12
[58] Field of Search.................... 331/94, 3; 324/.5 F

[56] References Cited
UNITED STATES PATENTS 3,304,516  2/1967  Novick et al. ......................... 331/94
3,667,066  5/1972  Kastler et al....................... 331/94 X Primary Examiner—Siegfried H. Grimm
Attorney, Agent, or Firm—Bierman & Bierman

[57] ABSTRACT

An atomic frequency standard is provided utilizing a spectral lamp and a cell, both lamp and cell being filled with a vaporous alkali element. The alkali element in the cell and/or lamp is comprised of a plurality of isotopes varied in concentration with respect to each other so that the ratio of said isotopes is different from the normal ratio of said isotopes.

12 Claims, 2 Drawing Figures

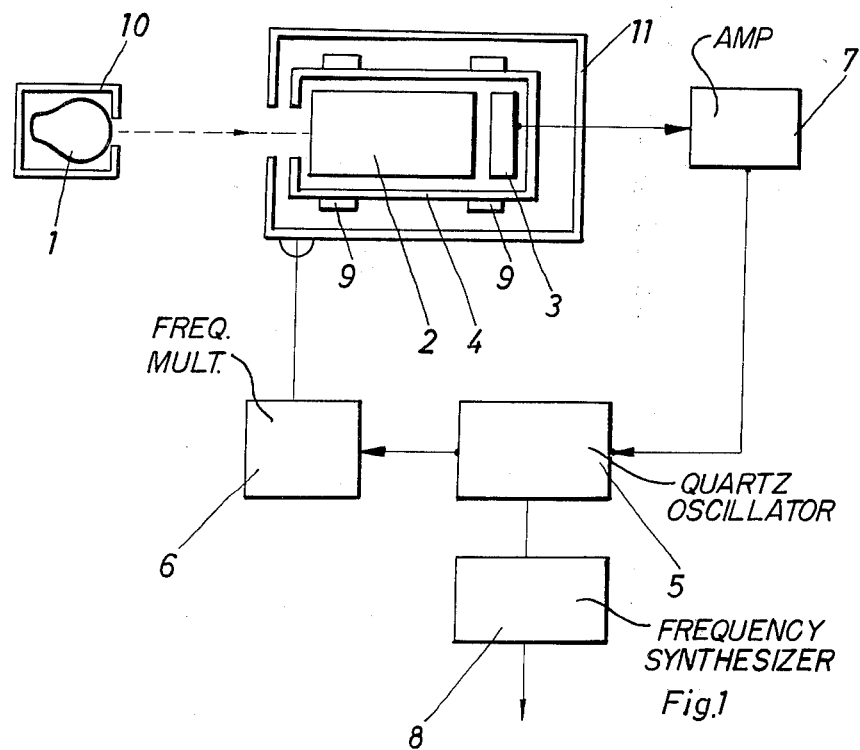
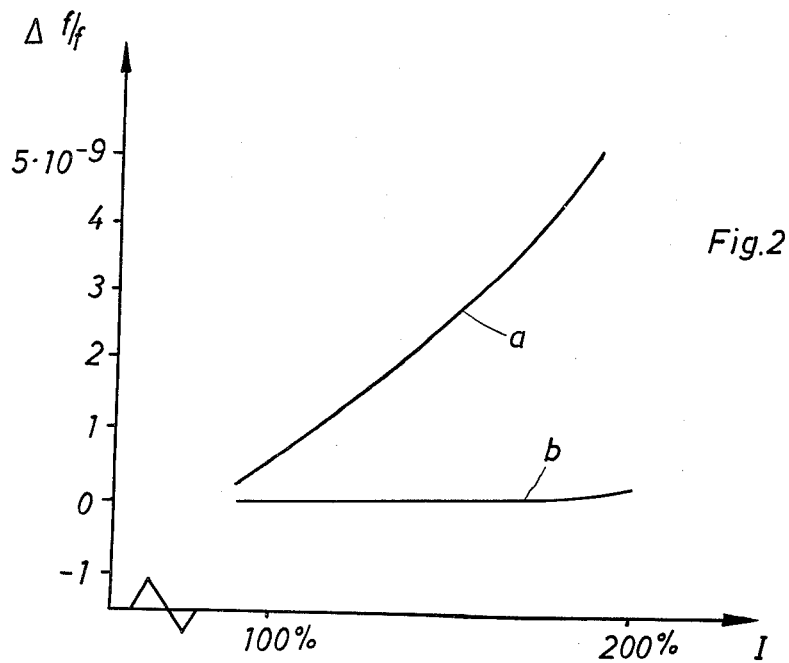

GAS CELL ATOMIC FREQUENCY STANDARD HAVING SELECTED ALKALI VAPOR ISOTOPE RATIOS

The invention generally relates to an atomic frequency standard of the type employing a gas-filled cell, and more specifically to use of a cell containing a vaporous alkali element. The cell is exposed to the light of a spectral lamp containing the same alkali element and to an electromagnetic high-frequency oscillation. Changes in light absorption occurring at resonance of the HF-oscillation with a hyperfine transition of the alkali atoms in the cell are detected and these changes are used to readjust an external oscillator.

Atomic frequency standards of the gas type have been commercially available for a long time. The underlying principle is the subject of numerous publications. They serve as extremely accurate frequency transmitters and long-term constancy of the oscillation frequency exceeds that of quartz oscillators by orders of magnitude. Generally cells of this type are arranged in a metallic cavity resonator in which the desired HF-oscillation is generated as cavity oscillation controlled by a quartz oscillator. In order to obtain a usable signal when the resonance condition is satisfied, additional measures are necessary, such as the production of an additional static, homogeneous magnetic field in the cell; use of one or several buffer gases in the cell and/or in the lamp; very accurate thermostating of the cell and of the lamp etc. As an alkali element, rubidium is generally used. It is the atoms of the isotope Rb 87 in the cell whose hyperfine transition, by its interaction both with the irradiated light and with the HF-oscillation, serves as a measure for the maintenance of the resonance condition. The isotope RB 87 may be used alone in either the lamp or cell. In such case, in order to improve and to stabilize the effect, an additional gas cell filled with the isotope Rb 87 has been used as a filter between the lamp and the cell used for cavity resonance. However, it is conventional to eliminate the latter by supplying a natural mixture of the isotopes Rb 85 and Rb 87 in the lamp and cell.

As is known to those skilled in the art, the resonant frequency associated with the hyperfine transition, which serves in the last analysis as a frequency measure and which is enhanced by the HF-oscillation, is not absolutely constant. It depends to a minor extent on external influences. One of these external influences is the dependence of the frequency on the intensity of the light which the cell receives from the lamp. Fluctuations or long-term variations of the light intensity can appear during lamp operation, particularly due to temperature variations of the lamp and discolorations of the glass surrounding the lamp. These fluctuations are a source of loss of constancy of the frequency of the apparatus. Attempts have been made to correct these fluctuations by a correcting signal derived from monitoring the light intensity. The above-mentioned dependence of the frequency on the light intensity can also be somewhat reduced by increasing the temperature of the cell or by arranging a filter cell with the isotope Rb 85 between the lamp and the cell. All these external measures are complicated, basically unsatisfactory, and beneficial to only a limited extent.

The object of the invention is to improve an atomic frequency standard of the above type in such a way that the dependence of the resonant frequency on the light intensity is a property of the apparatus that can be controlled at will.

This problem is solved by placing two isotopes of the aklali element in the lamp and/or in the cell in a ratio differing from the natural isotope ratio.

It has been surprisingly found that by varying the quantitive ratio of the isotopes of the alkali element contained in the lamp and/or in the cell, the degree of dependence of the frequency on the light intensity can be varied. It has further been found that the amount and the course of this dependence can be varied at will within a certain range by selection of a suitable ratio for the isotopes while the signal quality is at the same time improved. Ideally, frequency should be independent of light intensity. By utilizing isotopes of the alkali element in a ratio other than the natural ratio, the frequency can be made to be substantially independent of the light intensity particularly when no filter cell is arranged between the lamp and the resonant cell in accordance with a particularly advantageous embodiment of the instant invention.

If rubidium is used as an alkali element, an advantageous embodiment of the invention consists in that the lamp contains substantially only the isotope Rb 87 and the cell the isotopes Rb 85 and Rb 87 with a greater portion of Rb 85 than corresponds to the natural isotope ratio. The added amount of Rb 85 may be selected by varying the intensity of the lamp and measuring frequency shift until a desired value for the shift is achieved.

In another preferred embodiment the cell contains a mixture of the isotopes Rb 85 and Rb 87 substantially in the natural isotope ratio, and the lamp a mixture of the isotopes Rb85 and Rb87 with a greater portion of Rb87 than corresponds to the natural isotope ratio. The portion of Rb87 in the lamp is preferably between 35 and 90 percent, particularly between 50 and 60 percent, depending on the desired frequency dependence. The influence of the light intensity on the frequency was practically completely eliminated with a mixture of two parts natural rubidium and one part pure Rb87, which corresponds to a quantitive ratio of the isotopes Rb85 and Rb87 of about 1:1 (more accurately 48.5 : 51.5).

An embodiment of the invention will be described on the basis of the drawing.

FIG. 1 shows a principal diagram of the atomic frequency standard.

FIG. 2 shows schematically the dependence of the frequency on the light intensity with and without the application of the invention.

According to FIG. 1, the light radiated from a spectral lamp 10 passes through a resonant cell 2 made of a suitable glass and strikes a light receiver 3 which may be a photocell or other type of light receiver. The resonant cell 2 is arranged in a cavity resonator 4 which is excited to HF-oscillation by a quartz oscillator 5 through a frequency multiplier 6. The output signal of the light receiver 3 is amplified in an amplifier 7 and serves to adjust the quartz oscillator 5 to the resonant frequency, which is given by a hyperfine-transition of the atoms in the resonant cell 2. A conventional frequency synthesizer 8 is connected to quartz oscillator 5. A highly constant frequency of the desired value can be taken from the quartz oscillator 5 through synthesizer 8. The resonant cell 2 is arranged in addition in a static, homogeneous magnetic field, produced by Helmholtz coils 9, and the lamp 1 and the cell 2 are surrounded each by a thermostat 10, 11 respectively with which their temperature can be kept at a constant value which need not be the same for both the lamp and the cell.

In this embodiment, the resonant cell 2 is filled with the natural isotope mixture of rubidium (quantitative ratio Rb85 : Rb87 = 72.8 : 27.2), as well as with nitrogen and methane as a buffer gas with a pressure of a few torr. The lamp 1, which is designed as an electrodeless spectral lamp, contains nitrogen as a buffer gas and a mixture of two parts natural rubidium and one part Rb87. The isotopes Rb 85 and Rb 87 are then present in approximately the same weight ratio.

In FIG. 2 the curves a and b represent in arbitrary units the dependence of the relative frequency shift $\Delta f/f$ in relation to the intensity I of the light falling from the lamp on the cell. A course according to curve a is obtained if both lamp 1 and cell 2 contain the natural mixture of the isotopes Rb85 and Rb87. A course according to curve b is obtained if the lamp and cell are filled according to the foregoing example. Plainly, by following the preceding example, the influence of the light intensity on the frequency is practically eliminated by the quantitative ratio of the isotopes Rb85 and Rb87 in the lamp selected according to the invention.

The invention is not limited to details of the embodiment. For example, it can also be used with an atomic frequency standard which works with potassium instead of rubidium as an alkali element, since potassium also has two naturally occurring isotopes. Furthermore other than the above-mentioned buffer gases can be used in the lamp and cell, since the selection of the buffer gas is substantially uncritical for the dependence of the frequency on the light intensity.

It is intended to cover all modifications made in and to the above-described embodiments which do not constitute departures from the spirit and scope of the invention as defined in the claims appended hereto.

What is claimed is:

1. In an atomic frequency standard containing a cell having a vaporous alkali therein and a spectral lamp containing vaporous alkali therein for illuminating said cell, the improvement comprising means for changing the dependence of the resonance frequency of said cell on the intensity of light from said spectral lamp, said means comprising two isotopes of said alkali element in at least one of said spectral lamp and cell, the ratio of said isotopes to each other being different from the natural isotope ratio of said two isotopes by a selected amount sufficient to change to a selected degree the dependence of the resonance frequency of said cell on the intensity of light from said spectral lamp.

2. Atomic frequency standard according to claim 1 further comprising a high frequency oscillator connected to said cell for supplying electromagnetic oscillations, means for determining a resonance between said electromagnetic oscillations and a resonance frequency determined by a hyperfine transition of the alkali atoms contained in said cell, said means for determining resonance being connected to said oscillator for readjusting the frequency of said electromagnetic oscillations to said resonance frequency.

3. Atomic frequency standard according to claim 2, wherein said ratio is selected such that the resonance frequency of said cell is substantially independent of the said light intensity.

4. Atomic frequency standard according to claim 2 wherein the vaporous alkali is rubidium and the spectral lamp contains substantially only the isotope Rb87 and the cell the isotopes Rb85 and Rb87 with a greater portion of Rb85 than corresponds to the natural isotope ratio.

5. Atomic frequency standard according to claim 2 wherein the vaporous alkali is rubidium and wherein the cell contains a mixture of the isotopes Rb85 and Rb87 substantially in the natural isotope ratio, and the spectral lamp contains a mixture of the isotopes Rb85 and Rb87 with a greater portion of Rb87 than corresponds to the natural isotope ratio.

6. Atomic frequency standard according to claim 5 wherein the portion of Rb87 in the mixture of the isotopes Rb85 and Rb87 in the spectral lamp is between 35 and 90 weight percent.

7. Atomic frequency standard according to claim 6 wherein the portion of Rb87 in the mixture of said isotopes in said spectral lamp is between 50 and 60 weight percent.

8. An atomic frequency standard comprising a gas filled cell containing a vaporous alkali element, a spectral lamp for illuminating said cell, and means for applying electromagnetic oscillations to said cell at the resonance frequency of said cell, an oscillator having an output controlled by the resonance frequency in said cell, and means for determining changes in light absorption occurring at the resonance frequency by the hyperfine transition of the atoms in said gas filled cell and for adjusting the output of said oscillator in response to said changes in light absorption, and means for changing the dependence of said resonance frequency on the intensity of light emanating from said spectral lamp, the dependence changing means comprising two isotopes of said vaporous alkali in at least one of said spectral lamp and gas filled cell, the ratio of said isotopes to each other being different from the natural isotope ratio of said two isotopes by a selected amount sufficient to change said dependence to a selected degree.

9. The atomic frequency standard according to claim 8 wherein said oscillator supplies high frequency oscillations to said cell.

10. The atomic frequency standard according to claim 8 wherein said means for determining the changes in light absorption comprises a light receiver in said cell, an amplifier connected to the output of said light receiver, said oscillator being connected to the output of said amplifier, and static field applying means for applying a static field to said cell.

11. The atomic frequency standard according to claim 8 wherein the vaporous alkali is rubidium and wherein the lamp contains substantially only the isotope Rb87 and the cell the isotopes Rb85 and Rb87, the portion of Rb85 in said cell being greater than that which corresponds to the natural isotope ratio of Rb85 and Rb87.

12. The atomic frequency standard according to claim 8 wherein the vaporous alkali is rubidium and the cell contains a mixture of the isotopes Rb85 and Rb87 substantially in natural isotope ratio, and the spectral lamp contains a mixture of the isotopes Rb85 and Rb87 with a greater portion of Rb87 than corresponds to the natural isotope ratio.

* * * * *